US008656490B1

United States Patent
Sobel

(10) Patent No.: US 8,656,490 B1
(45) Date of Patent: Feb. 18, 2014

(54) SAFE AND SECURE ACCESS TO DYNAMIC DOMAIN NAME SYSTEMS

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 361 days.

(21) Appl. No.: 12/881,258

(22) Filed: Sep. 14, 2010

(51) Int. Cl.
  *H04L 29/06* (2006.01)
  *G06F 15/16* (2006.01)

(52) U.S. Cl.
  USPC ........ 726/22; 726/1; 726/14; 726/23; 726/24; 726/25; 713/156; 713/175; 709/227; 709/229

(58) Field of Classification Search
  USPC .......... 726/1, 14, 15, 3, 22–25; 713/156, 175; 709/227, 229
  See application file for complete search history.

(56) References Cited

U.S. PATENT DOCUMENTS

| 7,159,149 B2 | 1/2007 | Spiegel et al. ................. 714/43 |
| 7,249,187 B2 | 7/2007 | Sobel et al. .................... 709/229 |
| 7,366,919 B1 | 4/2008 | Sobel et al. .................... 713/201 |
| 7,472,418 B1 | 12/2008 | McCorkendale et al. ...... 726/24 |
| 7,490,244 B1 | 2/2009 | Kennedy et al. ............. 713/188 |
| 7,516,150 B1 | 4/2009 | McCorkendale et al. .... 707/102 |
| 7,549,169 B1 | 6/2009 | Sobel et al. .................... 726/26 |
| 7,634,811 B1 * | 12/2009 | Kienzle et al. ................. 726/22 |
| 7,640,590 B1 | 12/2009 | McCorkendale et al. ...... 726/25 |
| 7,650,382 B1 | 1/2010 | Sobel et al. .................... 709/206 |
| 7,694,343 B2 | 4/2010 | Sobel et al. ..................... 726/27 |
| 7,739,494 B1 * | 6/2010 | McCorkendale et al. ...... 726/22 |
| 2003/0055979 A1 * | 3/2003 | Cooley .......................... 709/227 |
| 2004/0016242 A1 * | 1/2004 | Song et al. ..................... 62/132 |
| 2008/0028465 A1 * | 1/2008 | Bantz et al. ..................... 726/22 |
| 2009/0043765 A1 * | 2/2009 | Pugh ................................ 707/6 |
| 2009/0106453 A1 * | 4/2009 | Miura ............................ 709/245 |
| 2009/0144437 A1 * | 6/2009 | Fishman et al. .............. 709/229 |
| 2010/0037314 A1 * | 2/2010 | Perdisci et al. ................. 726/22 |
| 2010/0318681 A1 * | 12/2010 | Shi ................................ 709/245 |

OTHER PUBLICATIONS

Working the botnet: how dynamic DNS is revitalising the zombie army, Simon Heron, pp. 9-11, Network Security, 2007.*

* cited by examiner

*Primary Examiner* — Philip Chea
*Assistant Examiner* — Shanto M Abedin
(74) *Attorney, Agent, or Firm* — Campbell Stephenson LLP

(57) ABSTRACT

A method and apparatus for safe and secure access to dynamic domain name systems. In one embodiment a method comprises transmitting a DNS query to a dynamic DNS server. The DNS query comprises a domain name. A DNS answer is received from the dynamic DNS server in response to transmitting the DNS query. The DNS answer comprises an IP address. A request is transmitted to a host at the IP address in response to receiving the DNS answer. A digital certificate is received in response to transmitting the request. The received digital certificate is then compared with each of a plurality of digital certificates stored in memory. The IP address is transmitted to a client computer system if the received digital certificate compares equally with one of the plurality of digital certificates.

22 Claims, 5 Drawing Sheets

SAFE AND SECURE ACCESS TO DYNAMIC DOMAIN NAME SYSTEMS

BACKGROUND OF THE INVENTION

The domain naming system (DNS) is used in TCP/IP networks, such as the Internet, to locate computers or services (e.g., a web server) through user-friendly domain names. When a user enters a domain name into an application (e.g., a browser), DNS services resolve the name to an IP address. Most users prefer a friendly domain name to locate a computer or service (hereinafter "host") on a network. A friendly name can be easier to learn and remember when compared to an IP address such as 208.77.188.166. However, computers communicate over a network by using IP addresses. To make the use of the network resources easier, DNS provides a way to map the user-friendly name for a host to its IP address.

Domain name resolution usually starts with a DNS client generated query, which contains the domain name of interest. DNS queries can be resolved in a number of different ways. A DNS client can sometimes locally answer a query with an IP address using cached information that was obtained from a previous query. A preferred DNS server to the DNS client can receive the query and use its own cache of information to answer if the DNS client cannot locally resolve the domain name. If the DNS server cannot resolve the domain name, the DNS server can query or contact other DNS servers on behalf of the requesting client to fully resolve the domain name. This last process is known as recursion.

SUMMARY OF THE INVENTION

A method and apparatus for safe and secure access to dynamic domain name systems. In one embodiment a method comprises transmitting a DNS query to a dynamic DNS server. The DNS query comprises a domain name. A DNS answer is received from the dynamic DNS server in response to transmitting the DNS query. The DNS answer comprises an IP address. A request is transmitted to a host at the IP address in response to receiving the DNS answer. A digital certificate is received in response to transmitting the request. The received digital certificate is then compared with each of a plurality of digital certificates stored in memory. The IP address is transmitted to a client computer system if the received digital certificate compares equally with one of the plurality of digital certificates. In some embodiments the domain name is compared with a domain name contained in the received digital certificate, and the IP address is transmitted to the client computer system if domain name compares equally with the domain name contained in the received digital certificate. In some embodiments the IP address is not transmitted to the client computer system if the domain name does not compare equally with the domain name contained in the received digital certificate. In some embodiments a loopback address is transmitted to the client computer system if the received digital certificate does not compare equally with one of the plurality of digital certificates. In some embodiments the plurality of digital certificates is received from a plurality of computer systems, respectively, and the plurality of digital certificates is stored in the memory. In some embodiments the IP address is mapped to one of the plurality of digital certificates in memory if the one of the plurality of digital certificates compares equally to the received digital certificate. In some embodiments a second DNS query is transmitted to the dynamic DNS server, the second DNS query comprises the domain name, a second DNS answer is received from the dynamic DNS server, and the IP address is transmitted to the client computer system or another client computer system if the second DNS answer contains the IP address that is mapped to the one of the plurality of digital certificates. In some embodiments a portion of the domain name is compared to each of a plurality of dynamic DNS domain names, and generating the query in response to a determination that the portion of the domain name compares equally with one of the dynamic DNS domain names.

In one embodiment a computer readable medium comprises computer readable instructions, and a computer system can implement a method in response to executing the instructions. This method comprises transmitting a DNS query to a dynamic DNS server, the DNS query comprises a domain name. A request is transmitted to an IP address in response to the computer system receiving a DNS answer from the dynamic DNS server. The DNS answer comprises the IP address. A digital certificate is compared with each of a plurality of digital certificates stored in memory, wherein the digital certificate is received by the computer system in response to transmitting the request. The IP address is transmitted to a client computer system if the received digital certificate compares equally with one of the plurality of digital certificates. In some embodiments the domain name is compared with a domain name contained in the received digital certificate, and the IP address is transmitted to the client computer system if domain name compares equally with the domain name contained in the received digital certificate. In some embodiments a different IP address is transmitted to the client computer system if the received digital certificate does not compare equally with one of the plurality of digital certificates. In some embodiments the IP address is mapped to one of the plurality of digital certificates in memory if the one of the plurality of digital certificates compares equally to the received digital certificate. In some embodiments a second DNS query is transmitted to the dynamic DNS server, the second DNS query comprises the domain name, a second DNS answer is received from the dynamic DNS server, and the IP address is transmitted to the client computer system or another client computer system if the second DNS answer contains the IP address that is mapped to the one of the plurality of digital certificates. In some embodiments the domain name or a portion thereof is compared to each of a plurality of entries in a memory, and generating the query in response to a determination that the domain name or the portion thereof compares equally with one of the plurality of entries in the memory.

In one embodiment, a method comprises transmitting a DNS query to a dynamic DNS server, the DNS query comprises a domain name. A DNS answer is received from the dynamic DNS server in response to transmitting the DNS query. The DNS answer comprises an IP address. A request is transmitted to a host at the IP address in response to receiving the DNS answer. A digital certificate is received in response to transmitting the request. The domain name is compared with a domain name contained in the received digital certificate. The IP address is transmitted to a client computer system if domain name compares equally with the domain name contained in the received digital certificate. A different IP address is transmitted to the client computer system if the domain does not compare equally with the domain name contained in the received digital certificate. In some embodiments the received digital certificate is compared with each of a plurality of digital certificates stored in memory, and the IP address is transmitted to the client computer system if the received digital certificate compares equally with one of the plurality of digital certificates.

In one embodiment a method comprises accessing a plurality of host records of a DNS server. An IP address in each of the plurality of host records is categorized as being a first type or not a first type. Host records of the plurality that contain an IP address that is categorized as being first type are counted. A domain name of the DNS server is added to a list of domain names corresponding to dynamic DNS service providers if the total count of host records that contain an IP address that is categorized as being first type exceeds a predetermined value.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
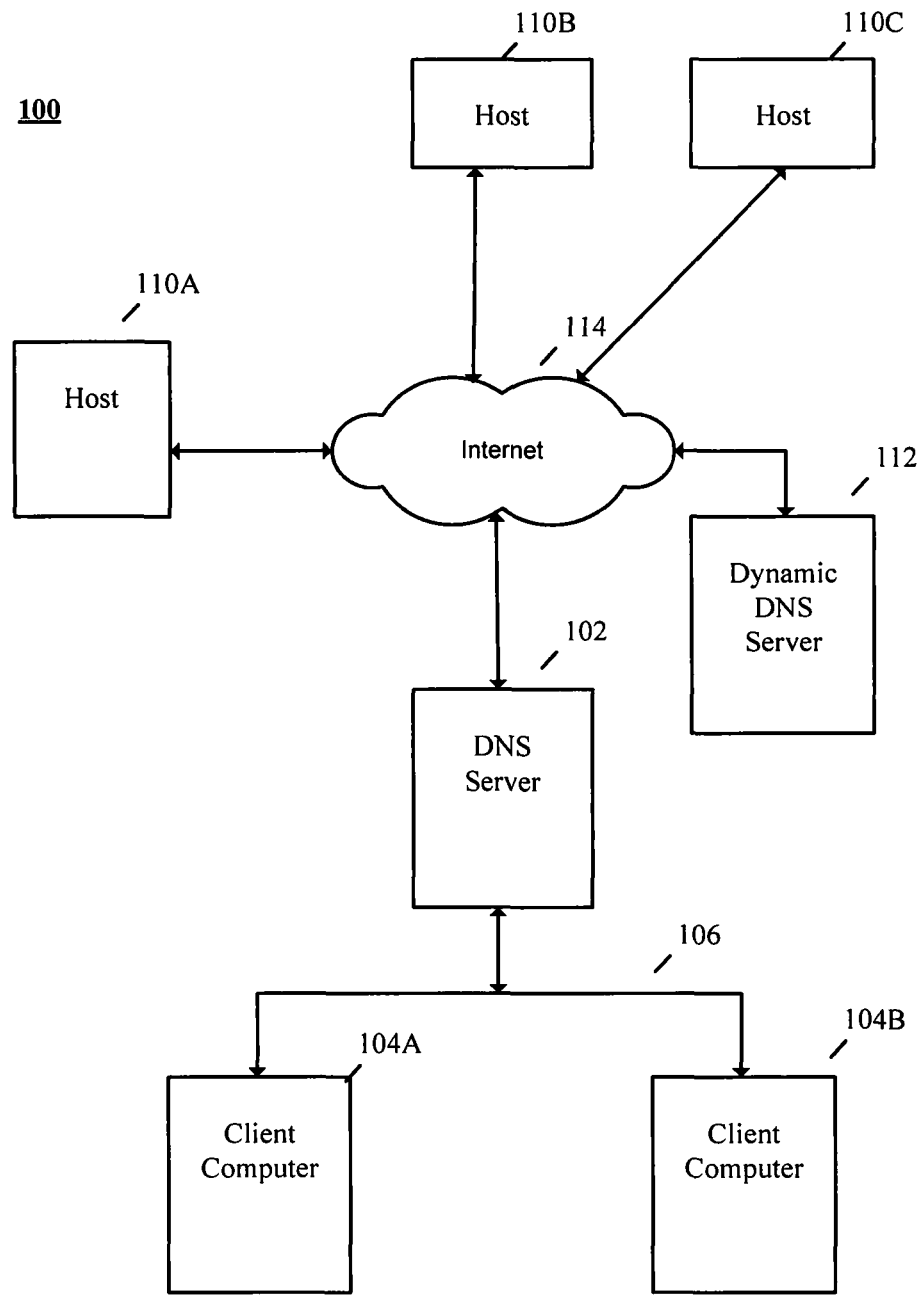
FIG. 1 graphically illustrates relevant components of an example system that employs DNS.

The explosive growth and proliferation of the Internet has brought a growing shortage of available IP addresses. Dynamic Host Configuration Protocol (DHCP) allows enterprises and Internet service providers (ISPs) to assign IP addresses to computers on-the-fly as they are powered up. DHCP helps to conserve the available IP address space, since not all devices are actively used at all times, and IP addresses could be assigned as needed. However, DHCP requires DNS servers to have current mapping information. Dynamic DNS aids this purpose: hosts notify their respective DNS servers of the address they receive from DHCP servers.

DHCP is an important tool for ISPs to manage their address spaces; it was possible to reuse address space set aside for these purposes. This, however, breaks the end-to-end principle of Internet architecture, and methods are required to allow private networks, masqueraded by frequently changing IP addresses, to discover their routable outside address and insert it into the domain name system in order to participate in Internet communications more fully. Today, numerous providers, called dynamic DNS service providers, offer such technology and services on the Internet.

Dynamic DNS service providers provide a software client program that automates the discovery and registration of a client's public IP addresses. The client program is executed on a device in the private network. It connects to the service provider's systems and causes those systems to link the discovered IP address of the device with a name in the domain name system. Depending on the provider, the name is registered within a domain owned by the provider. To illustrate, suppose a remote user wants to connect to his home computer. If the home computer has a fixed static IP address, the user can connect directly using the IP address. But unfortunately, many ISPs regularly change the IP address of their customers. By use of dynamic DNS, a home computer can associate automatically its current IP address with a domain name. As a result, the remote user can resolve the current IP address of the home computer by a DNS query. To further illustrate, the IP address can be 123.234.111.112 one day, 123.124.45.15 the next, but the dynamic DNS domain name will always be, for example, myhome.ddns.org.

Dynamic DNS service providers have created Internet securities issues. Dynamic DNS service providers allow anyone, including those with malicious intent, to freely create a dynamic domain name such as "mysubdomain.dyndns.org" which can be quickly and easily redirected to any new server when, for example, a botnet command and control center is identified and blocked. Many business organizations block access to dynamic DNS service providers in an attempt to control malware that use such systems for command and control. However, many legitimate businesses use dynamic DNS service providers, which may be blocked by organizations that deny connections to the intervening dynamic DNS servers.

FIG. 1 illustrates an example system 100 in block diagram form that addresses the foregoing issues. System 100 includes a DNS server 102 coupled to client computer systems 104 via network 106. DNS server 102 is also coupled to several hosts 110 and dynamic DNS (DDNS) server 112 via another network (e.g., the Internet) 114. Although not shown, client computer systems 104 may also be coupled to hosts 110 via network 114 to enable data communication therebetween.

DNS server 102 receives DNS queries from client computer systems 104. DNS server 102 may resolve some of the queries via recursion that involves DDNS server 112 or another DDNS server not shown. Before DNS server 102 answers a query with an IP address, DNS server 102 may initiate a process to verify the legitimacy of a host identified by that IP address. In doing so, DNS server 102 enables access of legitimate hosts by way of DNS lookups while preventing, for example, malware from accessing command and control centers.

Figure 2:
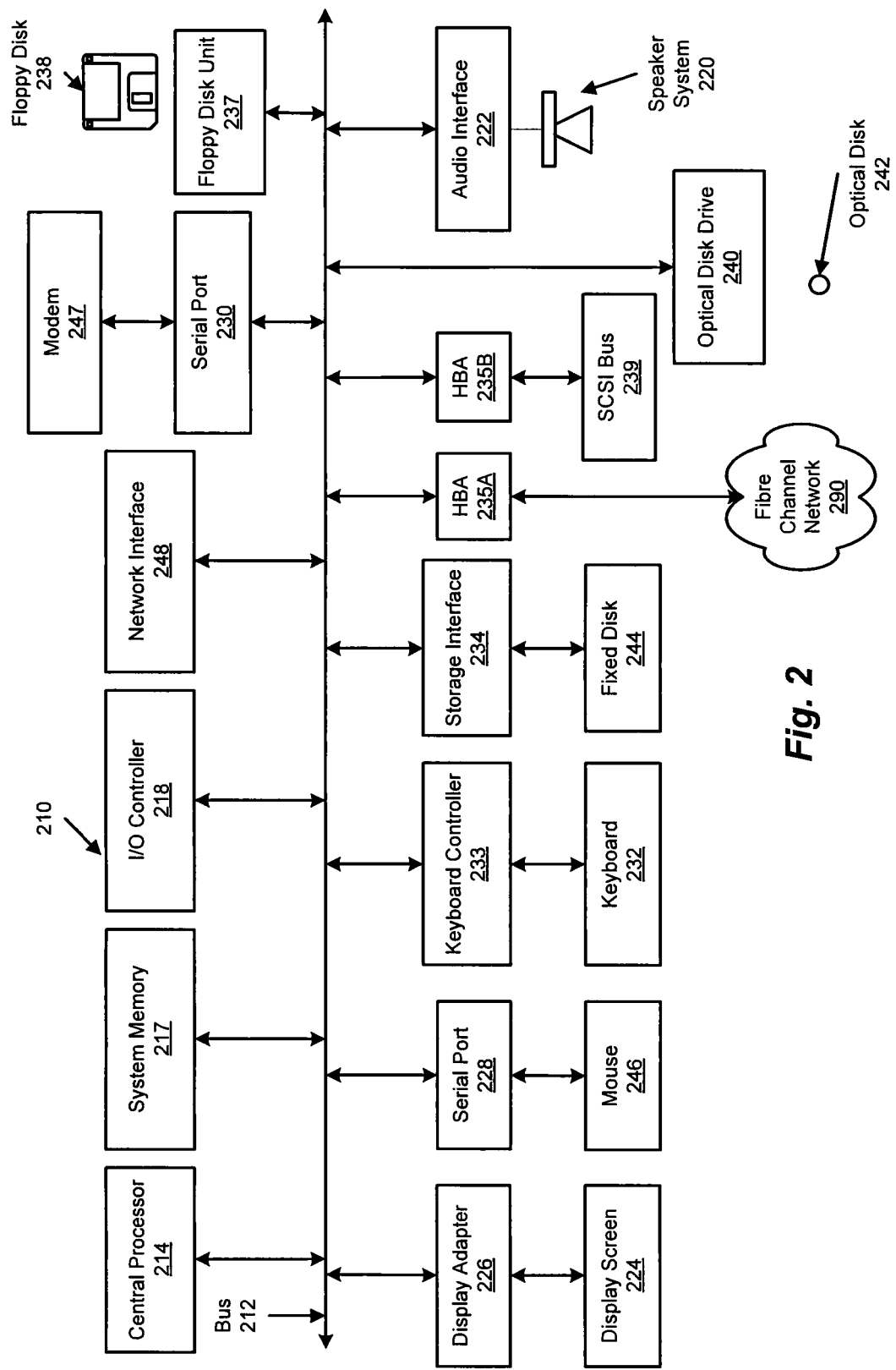
FIG. 2 is a block diagram of an example computer system that may be employed in the system of FIG. 1.

FIG. 2 depicts a block diagram of a computer system 210 suitable for implementing the present disclosure. Computer system 210 may be illustrative of various computer systems (e.g., servers, clients, etc.) shown in FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

The operation of a computer system such as that shown in FIG. 2 is readily known in the art and is not discussed in detail in this application. Code for verifying the legitimacy of a host, or other code to implement the present disclosure can be stored in computer-readable storage media such as one or more of system memory 217, fixed disk 244, optical disk 242, or floppy disk 238. Memory 220 is also used for storing temporary variables or other intermediate information during the execution of instructions by the processor 210. The operating system provided on computer system 210 may be MS-DOS®, MS-WINDOWS®, OS/2®, UNIX®, Linux®, or another known operating system.

Figure 3:
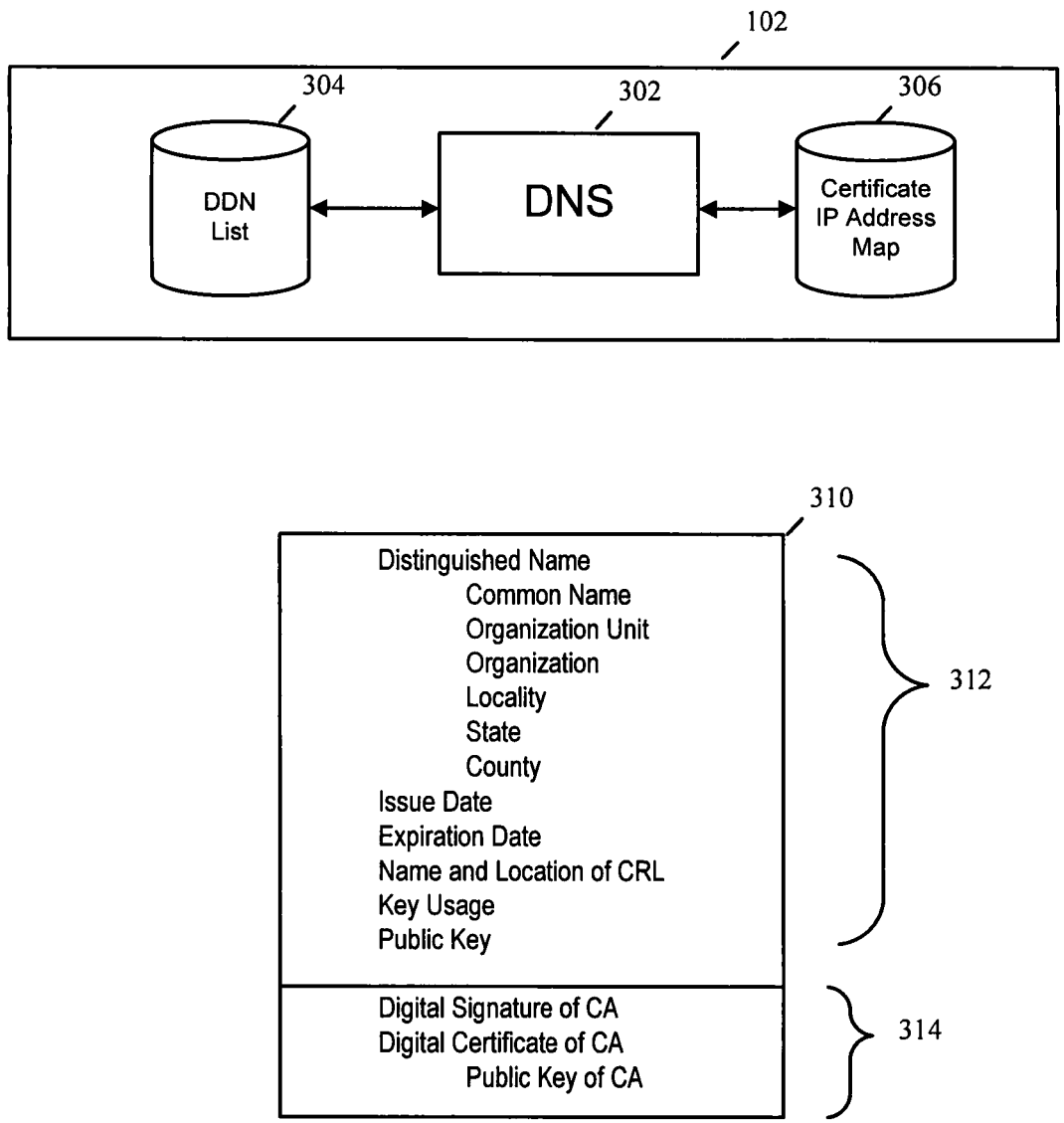
FIG. 3 is a block diagram of an example DNS server employed in the system shown in FIG. 1 and an example digital certificate employed the example DNS server.

FIG. 3 illustrates relevant components in block diagram form of an example embodiment of DNS server 102 shown in FIG. 1. More particularly, FIG. 3 shows a DNS module 302 in data communication with dynamic domain name (DDN) list memory 304 and digital certificate/IP address mapping memory 306. DDN list memory 304 contains a list of domain names or sub-domain names of dynamic DNS service providers. Mapping memory 306 contains legitimate digital certificates, more fully described below, some or all of which are mapped to IP addresses. Memories 304 and 306 are shown as included within DNS server 102. In an alternative embodiment, memories 304 and 306 may be contained in one or more storage devices external to and accessible by DNS module 302.

DNS module 302 can implement a process to verify the legitimacy of a host before the IP address of the host is provided to client computer system 104 via a DNS query. This process may include DNS module 302 requesting a copy of a digital certificate corresponding to the host. If a digital certificate is returned, DNS module 302 processes the digital certificate to determine its legitimacy. If legitimate, DNS module 302 provides the IP address of the host to the client computer system that requested it via DNS query. If a digital certificate is not returned to DNS module 302 or if DNS module determines a returned digital certificate is illegitimate, then DNS module 302 does not return the IP address of the host to client computer system 104. Rather, in one embodiment, DNS module 302 returns a loopback, sandbox, or other IP address to client computer system 104.

In one embodiment, DNS module determines the legitimacy of the digital certificate it receives by analyzing some or all the contents thereof. In another embodiment, DNS module 302 determines legitimacy by comparing the digital certificate with legitimate digital certificates stored in digital certificate/IP address mapping memory 306. In still another embodiment, DNS module 302 may determine legitimacy by analyzing some or all the contents of the digital certificate in addition to comparing the digital certificate to those stored in mapping memory 306. Other methods of determining legitimacy are contemplated, and the present invention should not be limited to the example methods disclosed herein.

Digital certificates can be provided by one or more trusted third parties (e.g., a certificate authority such as VeriSign, Inc.) that vet certificate applicants to determine the accuracy and veracity of information submitted in applications to obtain digital certificates. Digital certificates come in many shapes and sizes depending on the level of security sought. Digital certificates analyzed and/or compared by DNS module 302 need not be identically formatted. In other words, DNS module 302 can determine the legitimacy of different types of digital certificates, and digital certificates of differing types may be stored in digital certificate/IP address mapping memory 306 for subsequent comparison.

FIG. 3 graphically illustrates an example of an unencrypted digital certificate 310. As shown, the example digital certificate contains several fields: Distinguished Name; Issue Date; Expiration Date; Name And Location Of Certificate Revocation List (CRL); Key Usage; Public Key; Digital Signature Of Certificate Authority (CA); Digital Certificate Of CA, and: Public Key Of CA. Digital certificates are contemplated that contain additional fields or fewer fields than that shown in FIG. 3.

The Distinguished Name is the concatenation of several fields, including Common Name, one or more Organizational Units, Organization, Locality, State, and Country. The Common Name should be the domain name or sub-domain name of host corresponding to the digital certificate. The Issue Date may be the date that the digital certificate was issued by the CA, the entity that digitally signed the certificate. Expiration Date may be the date on which the digital certificate will expire. The Name And Location Of Certificate Revocation List (CRL) may be the name and location associated of a list that publishes digital certificates that have been revoked. This field is sometimes referred to as a "CRL distribution point." An example is URL=http://crl.versign.com/RSASecureServer.crl. Key Usage indicates certain attributes of the digital certificate. The Public Key may be paired with a private key so that techniques of public key cryptography (as that term is normally defined) can be employed. These fields are referred to collectively as the certificate proper 312.

The certificate authority (CA) is the entity that issued the digital certificate. The Digital Signature of the CA can be formed using a hash function to create a message digest of the certificate proper, which in turn is encrypted using the private key. The Digital Certificate of the CA can be used to verify the legitimacy of the CA, and typically contains the same or similar fields as certificate proper, including the public key of the CA. These fields are referred to as the signing block 314.

DNS module 302 may be implemented in any combination of hardware, firmware, and/or software. When implemented in software, DNS module 302 or sub-modules thereof can reside on one or more computer-readable media such as one or more hard disks of DNS server 102. While DNS module 302 is described as implemented on DNS server 102, the present invention should not be limited thereto. For example, the process performed by DNS module 302 could be implemented on a proxy in front of DNS server 102.

Figure 4:
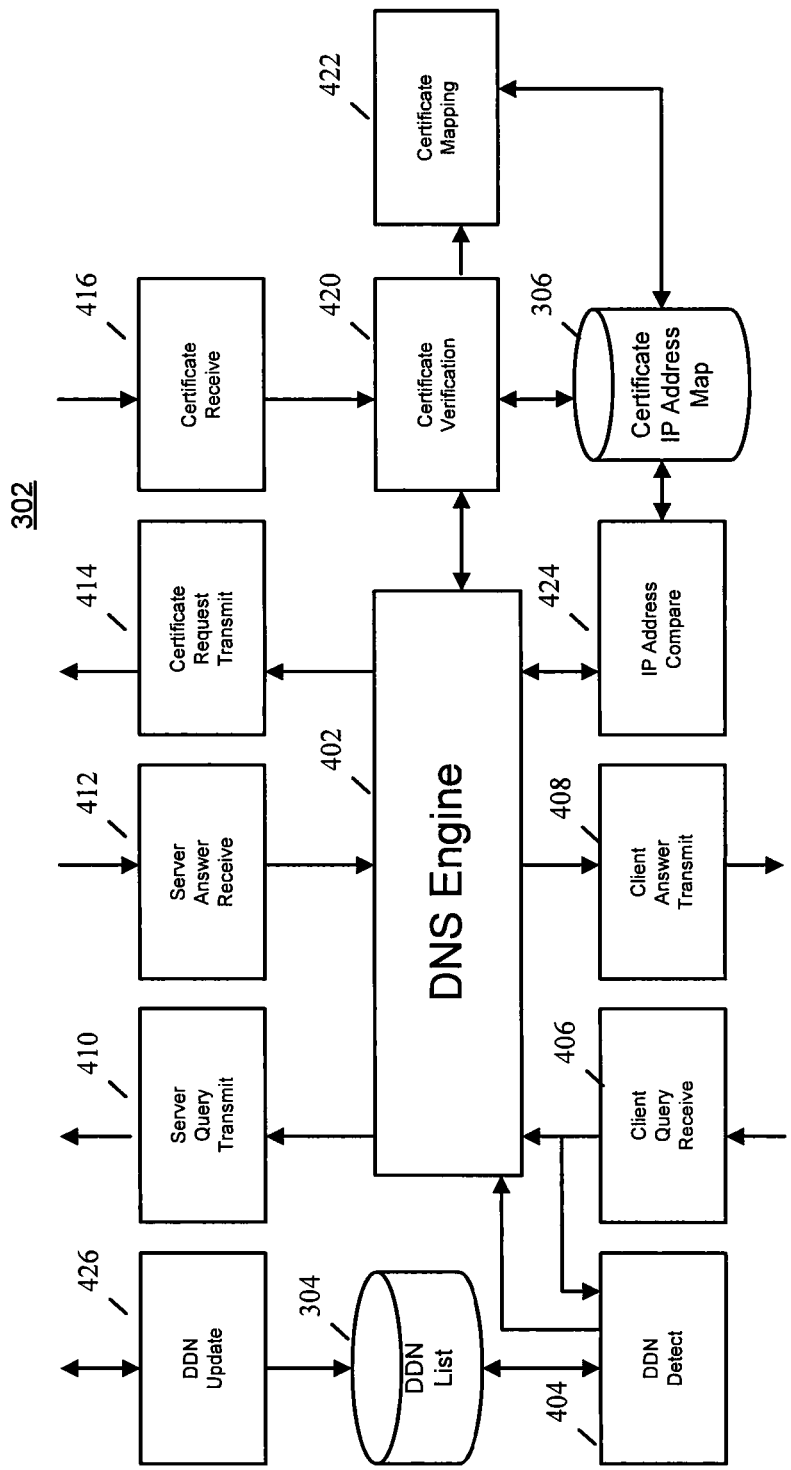
FIG. 4 is a block diagram that shows a more detailed view of the example DNS server of FIG. 3.

With continuing reference to FIG. 1, FIG. 4 illustrates in block diagram form relevant sub-modules of an example embodiment of DNS module 302. Each of the sub-modules may take form in instructions executing on one or more processors. DNS module 302 includes a client query receive module 406 that is configured to receive a DNS query from one of the client computer systems 104. Upon receipt, client query receive module may forward a copy of the query to DNS engine 402 and dynamic domain name (DDN) detection module 404. In response to receiving the query, DNS engine 402 eventually generates an answer that is subsequently transmitted to the requesting client computer system 104 via client transmit module 408. The answer may or may not contain the IP address sought by the DNS query.

DDN detection module 404 is configured to determine whether a client DNS query seeks the IP address for a dynamic domain name. DDN detection module 404 can make this determination by comparing the domain name, or portions thereof, of the query it receives with entries in DDN list memory 304. If the domain name, or portion thereof, of the DNS query compares equally with a domain name listed in memory 304, the domain name of the query is determined to be a dynamic domain name. When a match is found, a process is initiated for determining the legitimacy of the host corresponding to the domain name as will be more fully described below.

DNS engine 402 may locally resolve the client DNS query it receives from client query receive module 406. Or DNS engine may invoke the aid of an external DNS server, such as DDNS server 112, during recursion if the DNS query cannot be resolved locally. Recursion may include DNS engine generating a query that is subsequently transmitted to an external DNS server, such as DDNS server 112, via transmit module 410. Eventually, engine 402 should receive an answer that contains an IP address via receive module 412. If the IP address corresponds to a dynamic domain name as determined by DDN detection module 404, the host identified by the IP address should be checked for legitimacy by analyzing a corresponding digital certificate. To this end, DNS engine may generate a request for the host's digital certificate. This request may be subsequently transmitted via transmit module 414 and network 114, which route the request to the host (e.g., host 110) of interest using the IP address.

In response to receiving the request, the host 110 may return a text record that contains a digital certificate similar to that shown in FIG. 3. Alternatively, host 110 may return a URL where the requested digital certificate can be accessed. If the latter, DNS engine 402 should generate and send a follow-up request to retrieve the digital certificate at the URL. In another embodiment, rather than sending the request to the host, the DNS engine may query the dynamic DNS server that issued the dynamic domain name for a specific record that contains a URL for the digital certificate. This record would return a URI, which in turn identifies the location where the digital certificate could be retrieved.

DNS engine 402 may or may not receive a digital certificate in response to transmitting the request or the follow-up request. If received, module 416 forwards the digital certificate to verification module 420 for a legitimacy determination. Verification module 420 can determine the legitimacy of digital certificates by examining some or all the contents thereof, by comparing the digital certificates with certificates stored in digital certificate/IP address mapping memory 306, or by both examining and comparing.

There can be one or more reasons certificate verification module 420 can declare a digital certificate to be illegitimate after examination thereof. For example, a self-signed digital certificate gives rise to suspicion of nefarious intent, because very few attackers are willing to incur the vetting process that follows from applying for a digital certificate from a legitimate certificate authority. A self-signed digital certificate can be detected when verification module 420 compares the public key as given in the certificate proper with the public key of the certificate authority. If the keys do not compare equally, certificate verification module 420 may declare the certificate illegitimate. In general if a digital certificate is declared illegitimate, the IP address that was used to retrieve the digital certificate should not be returned to a client computer system 104.

A digital certificate not issued by a trusted certificate authority gives rise to suspicion. Certificate verification module 420 can test the trustworthiness of the certificate authority by examining the digital certificate of the certificate authority as given in the signature block, using conventional techniques of public key cryptography. This may entail going up a chain of digital certificates until a root certificate is encountered. A root certificate is a digital certificate that is self-signed by a certificate authority that certificate verification module 420 trusts. The process of verifying trustworthiness can be facilitated by certificate verification module 420 consulting a list in memory (not shown) of trusted certificate authorities. If the certificate authority cannot be trusted, certificate verification module 420 may declare the certificate illegitimate.

A digital certificate that has been revoked should be declared illegitimate. Verification module 420 can check revocation of a digital certificate by examining the certificate revocation list that is referred to in the certificate proper. A digital certificate that has expired should also be viewed as suspicious. The expiration of the digital certificate can be checked by examining the expiration date field within the certificate proper, and comparing this date with the date produced by certificate verification module 420's internal clock. If expired, certificate verification module 420 may declare the received certificate invalid.

A digital certificate having a domain name that does not match the domain name of the client DNS query should be viewed as suspicious. As noted, DNS engine 402 generates a request for a digital certificate when a DNS client query defines a dynamic domain name that is listed in memory 304. The domain name of the certificate should match the domain name of the DNS client query. Verification module 420 compares the domain name of the certificate with the domain name of the client DNS query. If they do not compare equally, certificate verification module 420 should declare the certificate is illegitimate.

A digital certificate that has been tampered is suspicious. Certificate tampering can be detected by certificate verification module 420 using techniques of public key cryptography. Specifically, in order to verify that the digital certificate has not been tampered with, certificate verification module 420 decrypts the digital signature of the certificate authority using the public key of the certificate authority, to get a first message digest. Then certificate verification module 420 compares the first message digest with a second message digest that it calculates by applying to the certificate proper the same hash function (e.g., MD-5) that the certificate authority used to calculate its version of the message digest. If the first and second message digests are the same, certificate verification module 420 concludes that digital certificate has not been tampered with. Otherwise certificate verification module 420 may declare the certificate as illegitimate.

Verification module 420 may implement one or more of the certificate field examinations described above, such as comparing the domain name of a certificate with the domain name of a DNS query, to judge whether a digital certificate is legitimate. In addition or in the alternative, certificate verification module 420 can verify the legitimacy of the received digital certificate by comparing the certificate with legitimate certificates in digital certificate/IP address mapping memory 306. If the received digital certificate compares equally with one in digital certificate/IP address mapping memory 306, the received certificate is deemed legitimate. If no match is found, certificate verification module 420 may declare the received digital certificate is illegitimate.

After processing a received digital certificate to determine legitimacy, certificate verification module 420 generates a result signal, which is subsequently provided to DNS engine 402. The result signal indicates legitimacy, or a lack thereof. DNS engine 402 answers client DNS queries with IP addresses corresponding to legitimate digital certificates. DNS engine 402 should not provide an IP address of a host associated with an illegitimate digital certificate. In this latter situation, DNS engine 402 may answer the DNS query with a predetermined address such as a loopback address.

As noted, digital certificate/IP address mapping memory 306 maps IP addresses to legitimate digital certificates. Some the digital certificates in memory 306 may not be mapped to IP addresses. For example, when a digital certificate is first entered into memory 306, it may not be associated with an IP address. If certificate verification module 420 determines that a received certificate is legitimate, and if the received digital certificate compares equally with one in mapping memory 306, certificate mapping module 430 will check to see if the matching digital certificate is mapped to an IP address in memory 306. If not, certificate mapping module 430 will map the matching certificate map to the associated IP address.

DNS module 302 of FIG. 4 includes an IP address compare module 424 in data communication with the DNS engine 402 and with mapping memory 306. DNS engine 402 receives IP addresses from DDNS servers, including DDNS server 112. In one embodiment, before DNS engine 402 generates a request for digital certificate, DNS engine 402 forwards the IP address it receives to compare module 424, which in turn compares the IP addresses with the IP addresses in mapping memory 306. If compare module 424 finds a matching IP address, which in turn maps to a digital certificate, the host at the IP address is presumed legitimate, and DNS engine 402 forwards the IP address to the client computer system 104 that requested it. In doing so, IP addresses for dynamic domain names are returned to a client computer system 104 without the processing overhead needed to request, receive, and subsequently process digital certificates to determine legitimacy.

Figure 5:
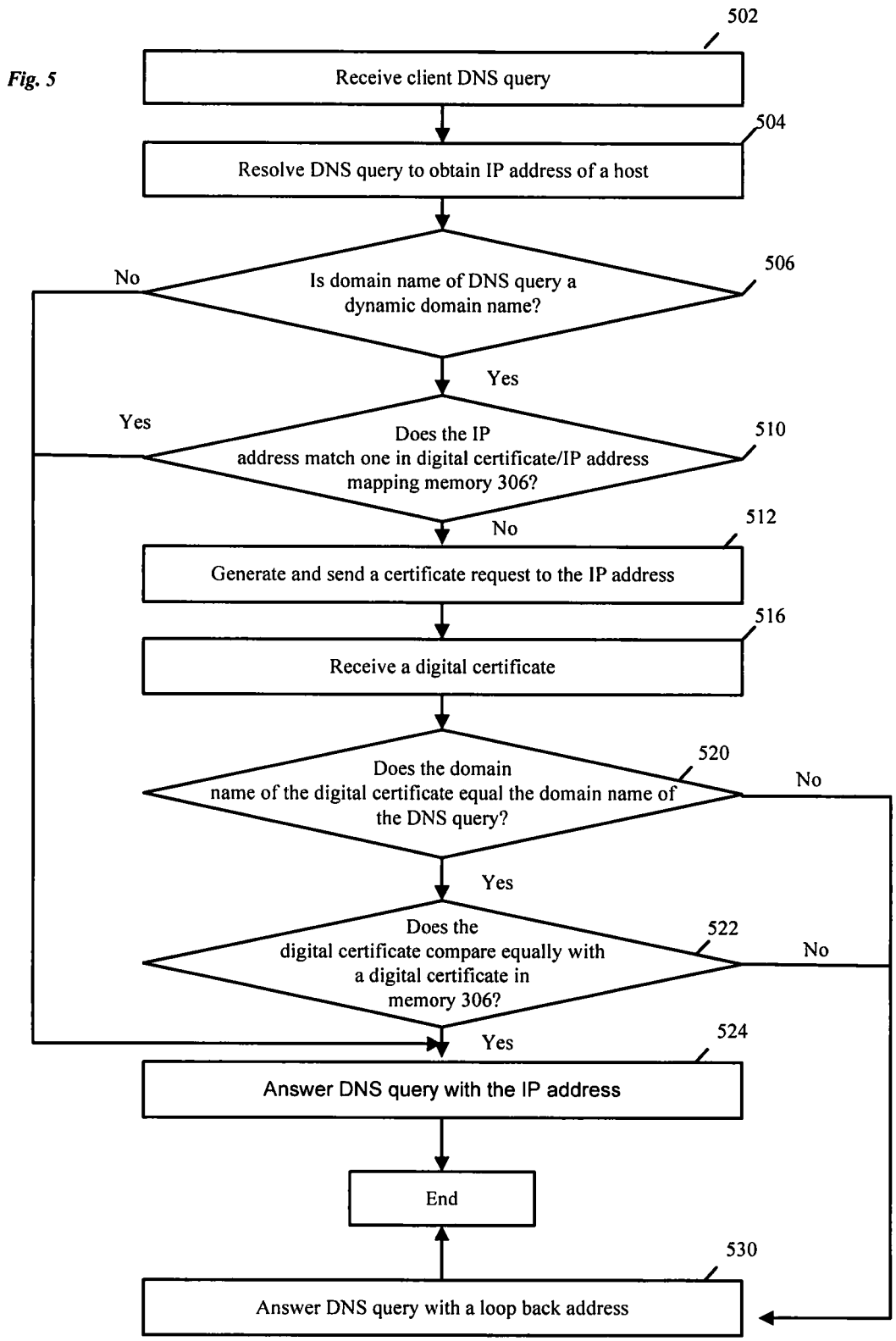
FIG. 5 is a flow chart that illustrates relevant aspects of a process implemented by the example DNS server shown in FIG. 4.

DNS module 302 operates to verify the legitimacy of hosts that are identified by dynamic domain names including dynamic sub-domain names. This may prevent malware on client computer systems 104 from communicating with botnet command and control centers that are referenced by dynamic DNS service providers. The foregoing describes operational aspects of various subcomponents of DNS module 302. FIG. 5 is a flow chart illustrating relevant aspects of an example process performed by the DNS module 302.

With continuing reference to FIGS. 1 and 4, the process shown in FIG. 5 begins at step 502 when the client query receive module 406 receives a DNS query from, for example, client computer system 104. Client query receive module 406 forwards the DNS query to DDN detection module 404 and DNS module 402. DNS engine 402 resolves the domain name contained in the DNS query to obtain an IP address as shown in step 504. This resolution may involve receiving the IP address from DDNS server 112 via recursion. In the meantime, DDN detection module 404 accesses the DDN list memory module 304 to determine whether the domain name of the received DNS query is a dynamic domain name issued by a dynamic domain name provider as shown in step 506. If it is, the process proceeds to step 510. Otherwise, the DNS engine forwards the IP address obtained in step 504 to the client computer system 104 that generated the DNS query.

If the DNS query is determined to contain a dynamic domain name, then in step 512 compare module 424 compares the IP address obtained in step 504 with IP addresses of in memory 306 to determine whether a match exists. If a matching IP address exists, DNS engine 402 forwards the obtained IP address to the computer system 104 that generated the DNS query as shown in step 524. In one embodiment, before the DNS engine 402 answers the query of step 502 with the obtained IP address, DNS engine 402 compares the domain name of the DNS query with the domain name of the digital certificate mapped to the matching IP address. Step 524 is implemented only if the domain names compare equally. Otherwise, the query is answered with a loop back address.

If the IP address is not within memory 306, DNS engine 402 generates a request for a digital certificate which is subsequently transmitted via certificate request transmit module 414 to the host at the obtained IP address as shown in step 512. Receive module 416 may or may not receive a digital certificate in response to the request transmitted in step 512. If a digital certificate is not received within a predetermined amount of time, DNS engine 402 may send a loopback address to the client computer system in an answer to the DNS query that was received in step 502.

If a digital certificate is received at step 516, the domain name of the received digital certificate is compared by verification module 420 with the domain name of the client DNS request that was received in step 502. If these two domain names do not compare equally, DNS engine returns the aforementioned loopback address to the client computer system as an answer to the DNS query as shown in step 530. If the domain names compare equally at step 520, verification module 420 compares the received digital certificate with digital certificates contained within certificate/IP address mapping memory 306 to determine whether an equivalent is contained therein. If a match exists, the digital certificate received in step 516 is legitimate, and DNS engine 402 answers the DNS query received in step 502 with the IP address obtained in step 504. Further, certificate map module 422 maps the matching digital certificate within memory 306 with the IP address that was obtained in step 502 if the digital certificate is not already mapped within memory 306. If match does not exist within memory 306, the digital certificate is declared illegitimate and DNS engine 402 answers the DNS query of step 502 with a loopback address.

Digital certificate/IP address map memory 306 should contain legitimate digital certificates that are created by trusted certificate authorities. Upon request the administrator of DNS server 102 can download certificates to memory 306 that were created by trusted certificate authorities. Further, when certificate verification module 420 declares a certificate as legitimate in response examining one or more fields of a digital certificate, the verification module 420 may store the digital certificate within memory 306 if the certificate is not already stored therein.

DDN list memory 304, as noted above, contains a list of dynamic domain names provided by dynamic DNS providers. A DDN update module 426 may be configured to auto discover dynamic DNS providers and the domain names thereof. Records within a DNS system, including DNS servers thereof, are queried by DDN update module 426 against a database of IP address types (such as a Real-time Blackhole list typically used for anti-spam) which indicates whether an IP address is likely a DSL, cable, or other "end-user" type address. When a threshold of names of the DNS system that point to an "end-user" type address is reached, the domain name of the DNS system is considered to be provided by a dynamic DNS service provider and the domain name and any sub-domain name thereof can be automatically added to the DDN list of memory 304 by DDN update module 426.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a plurality of digital certificates;
storing the plurality of digital certificates in a memory;
transmitting a DNS query to a dynamic DNS server, wherein
the DNS query comprises a domain name;
receiving a DNS answer from the dynamic DNS server in response to transmitting the DNS query, wherein
the DNS answer comprises an IP address;
transmitting a request to a host at the IP address in response to receiving the DNS answer;
receiving a digital certificate in response to transmitting the request;
comparing the received digital certificate with each of the plurality of digital certificates stored in the memory;
comparing the domain name with a domain name contained in the received digital certificate; and
transmitting the IP address to a client computer system if the received digital certificate compares equally with one of the plurality of digital certificates, wherein
the IP address is transmitted to the client computer system if the domain name compares equally with the domain name contained in the received digital certificate.

2. The method of claim 1 wherein the IP address is not transmitted to the client computer system if the received digital certificate does not compare equally with one of the plurality of digital certificates.

3. The method of claim 1 wherein the IP address is not transmitted to the client computer system if the domain name does not compare equally with the domain name contained in the received digital certificate.

4. The method of claim 1 wherein a loopback address is transmitted to the client computer system if the received digital certificate does not compare equally with one of the plurality of digital certificates.

5. The method of claim 1 wherein a loopback address is transmitted to the client computer system if the domain name does not compare equally with the domain name contained in the received digital certificate.

6. The method of claim 1 wherein
the plurality of digital certificates are received from a plurality of computer systems, respectively.

7. The method of claim 1 further comprising an act of mapping the IP address to one of the plurality of digital certificates in memory if the one of the plurality of digital certificates compares equally to the received digital certificate.

8. The method of claim 7 further comprising:
transmitting a second DNS query to the dynamic DNS server, the second DNS query comprises the domain name;
receiving a second DNS answer from the dynamic DNS server;
transmitting the IP address to the client computer system or another client computer system if the second DNS answer contains the IP address that is mapped to the one of the plurality of digital certificates.

9. The method of claim 1 further comprising an act of comparing a portion of the domain name to each of a plurality of dynamic DNS domain names, and generating the query in response to a determination that the portion of the domain name compares equally with one of the dynamic DNS domain names.

10. The method of claim 1 wherein the received digital certificate comprises a digital signature.

11. The method of claim 1, wherein at least some of the plurality of digital certificates are created by one or more trusted certificate authorities.

12. The method of claim 1, wherein a first of the plurality of digital certificates is different from a second of the plurality of digital certificates.

13. The method of claim 1 wherein
a different IP address is transmitted to the client computer system if the domain name does not compare equally with the domain name contained in the received digital certificate.

14. A non-transitory computer readable medium comprising computer readable instructions, wherein a computer system is configured to implement a method in response to executing the instructions, the method comprising:
receiving a plurality of digital certificates;
storing the plurality of digital certificates in a memory;
transmitting a DNS query to a dynamic DNS server, wherein the DNS query comprises a domain name;
transmitting a request to an IP address in response to the computer system receiving a DNS answer from the dynamic DNS server, wherein
the DNS answer comprises the IP address;
comparing a digital certificate with each of the plurality of digital certificates stored in the memory, wherein
the digital certificate is received by the computer system in response to transmitting the request;
transmitting the IP address to a client computer system if the received digital certificate compares equally with one of the plurality of digital certificates, wherein
the IP address is transmitted to the client computer system if the domain name compares equally with the domain name contained in the received digital certificate.

15. The non-transitory computer readable medium of claim 14 wherein the method further comprises an act of transmitting a different IP address to the client computer system if the received digital certificate does not compare equally with one of the plurality of digital certificates.

16. The non-transitory computer readable medium of claim 14 wherein the method further comprises an act of transmitting a different IP address to the client computer system if the domain name does not compare equally with the domain name contained in the received digital certificate.

17. The non-transitory computer readable medium of claim 14 wherein the method further comprises an act of mapping the IP address to one of the plurality of digital certificates in memory if the one of the plurality of digital certificates compares equally to the received digital certificate.

18. The non-transitory computer readable medium of claim 17 wherein the method further comprises:
  transmitting a second DNS query to the dynamic DNS server, the second DNS query comprises the domain name;
  receiving a second DNS answer from the dynamic DNS server;
  transmitting the IP address to the client computer system or another client computer system if the second DNS answer contains the IP address that is mapped to the one of the plurality of digital certificates.

19. The non-transitory computer readable medium of claim 14 wherein the method further comprises an act of comparing the domain name or a portion thereof to each of a plurality of entries in a memory, and generating the query in response to a determination that the domain name or the portion thereof compares equally with one of the plurality of entries in the memory.

20. The non-transitory computer readable medium of claim 14 wherein the received digital certificate comprises a digital signature.

21. A method comprising:
  transmitting a DNS query to a dynamic DNS server, the DNS query comprises a domain name;
  receiving a DNS answer from the dynamic DNS server in response to transmitting the DNS query, wherein the DNS answer comprises an IP address;
  transmitting a request to a host at the IP address in response to receiving the DNS answer;
  receiving a digital certificate in response to transmitting the request;
  comparing the domain name with a domain name contained in the received digital certificate;
  transmitting the IP address to a client computer system if domain name compares equally with the domain name contained in the received digital certificate;
  transmitting a different IP address to the client computer system if the domain name does not compare equally with the domain name contained in the received digital certificate.

22. The method of claim 21 further comprising:
  comparing the received digital certificate with each of a plurality of digital certificates stored in memory;
  wherein the IP address is transmitted to the client computer system if the received digital certificate compares equally with one of the plurality of digital certificates.

* * * * *